(12) United States Patent
Jeon

(10) Patent No.: US 8,601,576 B2
(45) Date of Patent: Dec. 3, 2013

(54) APPARATUS AND METHOD FOR SPAM CONFIGURATION

(75) Inventor: Yong-Joon Jeon, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 350 days.

(21) Appl. No.: 12/703,906

(22) Filed: Feb. 11, 2010

(65) Prior Publication Data

US 2010/0205668 A1    Aug. 12, 2010

(30) Foreign Application Priority Data

Feb. 11, 2009 (KR) ........................ 10-2009-0010912

(51) Int. Cl.
*H04L 29/06* (2006.01)
(52) U.S. Cl.
USPC .......................................... 726/22; 709/224
(58) Field of Classification Search
USPC ......................................................... 726/22
See application file for complete search history.

(56) References Cited

U.S. PATENT DOCUMENTS

| | | | |
|---|---|---|---|
| 8,042,149 B2 * | 10/2011 | Judge | 726/1 |
| 2006/0026242 A1 * | 2/2006 | Kuhlmann et al. | 709/206 |
| 2006/0123083 A1 * | 6/2006 | Goutte et al. | 709/206 |
| 2007/0143422 A1 * | 6/2007 | Cai | 709/206 |
| 2008/0009299 A1 * | 1/2008 | Ryu | 455/466 |
| 2008/0127345 A1 * | 5/2008 | Holtmanns et al. | 726/23 |

* cited by examiner

*Primary Examiner* — Kambiz Zand
*Assistant Examiner* — Ghodrat Jamshidi
(74) *Attorney, Agent, or Firm* — Cha & Reiter, LLC

(57) ABSTRACT

An apparatus and a method for spam registration in a portable terminal are provided. The method includes determining whether there is a spam registration request for a number, determining whether spam registration prohibit condition not to register the number as spam is satisfied when there is the spam registration request for the number and not registering the number as spam when the spam registration prohibit condition is satisfied.

20 Claims, 3 Drawing Sheets

APPARATUS AND METHOD FOR SPAM CONFIGURATION

CLAIM OF PRIORITY

This application claims the benefit of earlier Korean patent application filed in the Korean Intellectual Property Office on Feb. 11, 2009 and assigned Serial No. 10-2009-0010912, the entire disclosure of which is hereby incorporated by reference.

BACKGROUND OF THE INVENTION

1. Field of the Invention

The present invention relates to an apparatus and a method for generating a spam registration condition, and more particularly for performing a spam registration and a spam deregistration automatically based on a user's call log.

2. Description of the Related Art

Generally, when a user registers spam numbers, the user selects a corresponding numbers from a call log or a message list, then the user launches an application for spam registration. The registered spam numbers cannot be unregistered until the user performs a deregistration operation.

Children tend to randomly push any key when playing with parents' portable terminals. In some cases, the children may inadvertently register number as spam that is not intended. As a result, the parents may not be aware of this accidental spam registration.

Moreover, who are not familiar with functions of the portable terminal, may unintentionally perform a spam registration on frequently used numbers.

As set for above, the spam registration may be performed unintentionally. In this case, the registered spam numbers remains to be registered as spam until the user performs the spam deregistration to undo the spam registration process.

Accordingly, a need exists for an apparatus and a method for spam configuration that can avoid accidental spam registration.

SUMMARY OF THE INVENTION

An aspect of the present invention is to solve at least the above-mentioned problems and/or disadvantages and to provide at least the advantages described below. Accordingly, an aspect of the present invention is to provide an improved apparatus and method for spam configuration.

Another aspect of the present invention is to provide an apparatus and method for an automatic deregistration for registered spam numbers, which are unintentionally registered, based on a call log.

Still another aspect of the present invention is to provide an apparatus and method for an automatic deregistration for registered spam numbers that are intentionally registered if a certain condition is met.

In accordance with an aspect of the present invention, a method for a spam registration in a portable terminal includes determining whether there is a spam registration request for a number, determining whether a spam registration prohibit condition not to register the number as a spam is satisfied upon receiving the spam registration request, and preventing the registration of number as spam when the spam registration prohibit condition is satisfied.

In accordance with another aspect of the present invention, a method for a spam deregistration in a portable terminal includes determining whether a spam deregistration condition for a number is satisfied and deregistering the number from a spam registration when the spam deregistration condition is satisfied.

In accordance with yet another aspect of the present invention, an apparatus for a spam registration in a portable terminal includes a spam registration unit for determining whether there is a spam registration request for a number, for determining whether a spam registration prohibit condition not to register the number as spam is satisfied, and for not registering the number as spam when the spam registration prohibit condition is satisfied.

In accordance with still another aspect of the present invention, an apparatus for a spam deregistration in a portable terminal includes a spam deregistration unit for determining whether a spam deregistration condition for a number is satisfied and for deregistering the number from a spam registration when the spam deregistration condition is satisfied.

BRIEF DESCRIPTION OF THE DRAWINGS

The above and other aspects, features and advantages of certain exemplary embodiments of the present invention will be more apparent to those skilled in the art from the following detailed description taken in conjunction with the accompanying drawings, in which.

DETAILED DESCRIPTION OF THE INVENTION

Exemplary embodiments of the present invention will be described below with reference to the accompanying drawings. For the purposes of clarity and simplicity, well-known functions or constructions are not described in detail as they would obscure the invention in unnecessary detail.

Hereinafter, an apparatus and a method for spam configuration will be described. The present invention prevents people, who may or may not be well versed with functions of the portable terminal, perform a spam registration unintentionally, by providing a spam deregistration automatically as soon as possible desired numbers are registered as spam.

The teachings of present invention are applicable when a user initiates a spam configuration via a user interface menu. That is, the user interface menu may be provided with sub menus for a spam registration (A) and a spam deregistration (B) respectively.

At first, the spam registration (A) will be explained.

A spam registration condition is determined by a user in the spam configuration sub menu of the menu. At this time, only an originated call should be considered in prohibition of spam configuration because a received call is not typically target under the consideration of spam. Thus, it is not appropriate to consider the received call for the spam configuration.

An example for the spam registration will be explained below.

Condition (1) Numbers of times for Originated call: 5
Condition (2) Numbers of times for Transmitted message: 3
Condition (3) Previously stored in the Phone book: Yes In above case, the spam registration is prohibited when even one condition is satisfied among 3 conditions listed above. That is, when a specific number is chosen by a user to register as spam, if one condition of 3 conditions above is satisfied, the spam registration is prohibited.

In this case, when the user registers the specific number as a spam, if one condition is satisfied among 3 conditions above, a pop up message is displayed. The pop up message is "The number you have chosen is used frequently. Do you really want to the number as s spam?" Herein, a default value for answer may be "NO".

Figure 1:
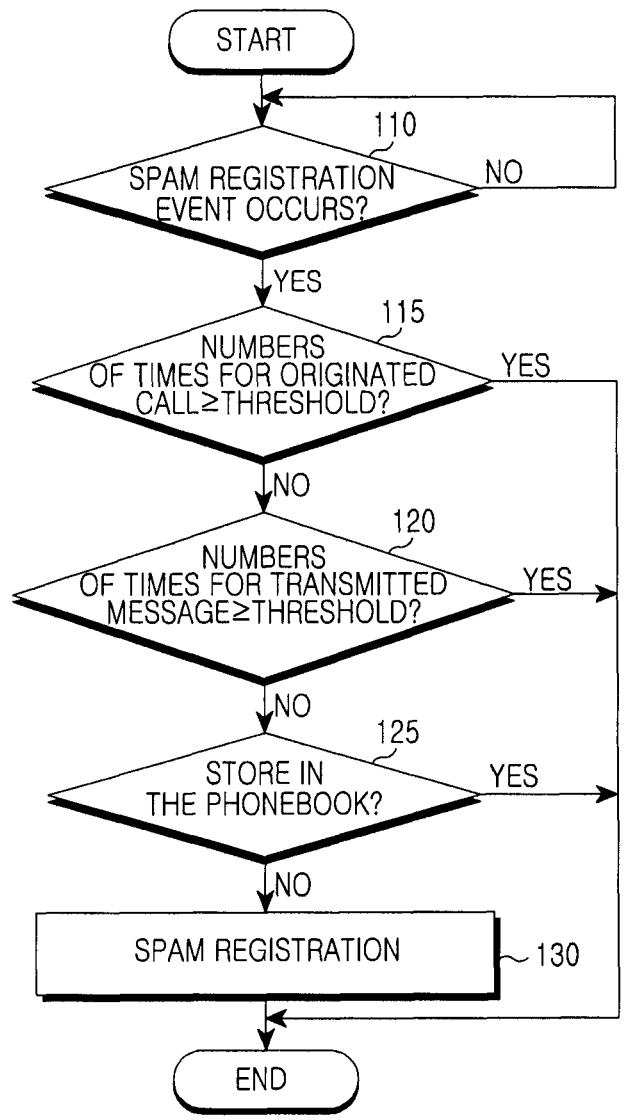
FIG. 1 illustrates a flowchart for a spam registration according to an exemplary embodiment of the present invention.

FIG. 1 illustrates a flowchart for spam registration according to an exemplary embodiment of the present invention.

Referring to FIG. 1, when a spam registration event occurs for a specific number in step 110, the step 110 may be performed by the user intentionally or may be performed automatically.

When numbers of times for originated call for the specific number is greater than a threshold value in step 115 or when numbers of times for transmitted message for the specific number is greater than a threshold value in step 120 or when the specific number is already stored in the phone book in step 125, a spam registration for the specific number is prohibited by the portable terminal. That is, even if one condition is satisfied among 3 conditions above, the spam registration for the specific number is prohibited.

When none of the three conditions above is satisfied in step 115, 120 and 125, the spam registration is granted and is performed by the portable terminal in step 130.

At second, the spam deregistration (B) will be explained.

An criteria for the spam deregistration (B) is based on a time period (i.e., one week, one month, etc) or numbers of times for originated call for a spam number (i.e., more than 5) or numbers of times for transmitted message for a spam number (i.e., 3 times). When the time period or the numbers of times for originated call or the numbers of times for transmitted message satisfies each threshold condition, a pop up message requesting the spam deregistration for the number registered as spam is displayed.

Further, when the user attempts to store a number which is not stored in the phone book and if the number which the user attempts to store is registered as spam, a pop up message requesting the spam deregistration for the number registered as spam is displayed. One example of the pop up message is "The spam registration is performed for the number, would you like to deregister?" In the pop up message, default value may be configured as "NO".

That is, if above conditions are satisfied for the number registered as spam, the pop up message requesting the spam deregistration for the numbers registered as spam is displayed. Herein, the configured condition for determined time period may be one week and the configured condition for the numbers of times for originated call may be 5 and the configured condition for the numbers of times for transmitted message may be 3.

Note that above examples is for illustrative purposes, and other threshold hold criteria may be implemented or may be set by a user or an operator.

Figure 2:
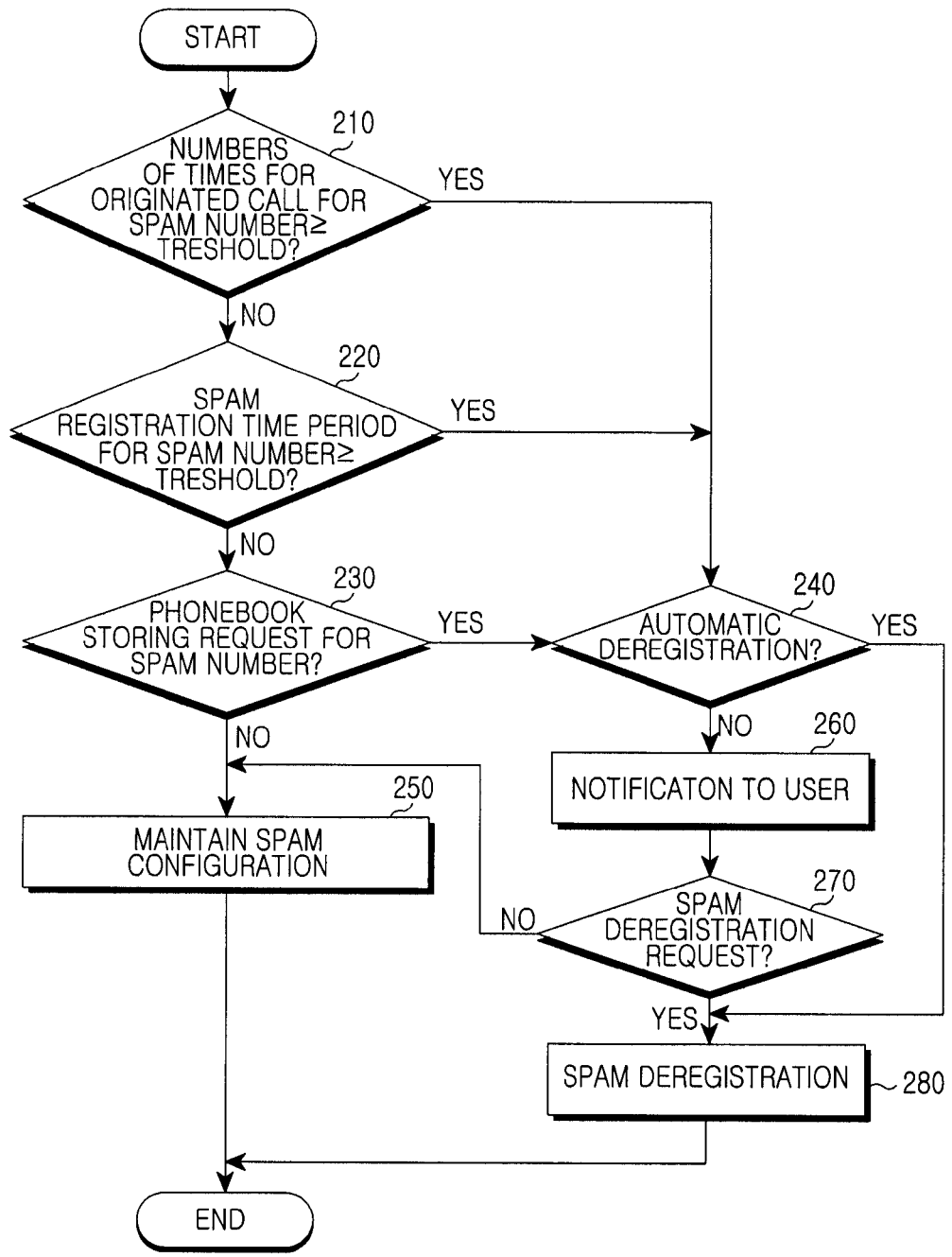
FIG. 2 illustrates a flowchart for a spam deregistration according to an exemplary embodiment of the present invention; and, FIG. 3 illustrates a block diagram of a portable terminal according to an exemplary embodiment of the present invention.

FIG. 2 illustrates a flowchart for a spam deregistration according to an exemplary embodiment of the present invention.

Referring to FIG. 2, when numbers of times for originated call for a spam number or numbers times for transmitted message for a spam number is greater than each threshold value in step 210, or when a spam registration time period for the spam number is longer than a threshold in step 220, or when a phone book storing event occurs for the spam number in step 230. The step 230 indicates the user attempts to store the spam number into the phonebook, the portable terminal performs operations below.

The portable terminal determines whether an automatic spam deregistration is configured for the spam number in step 240, and if so, the portable terminal performs the spam deregistration in step 280.

When the automatic spam deregistration is not configured, the portable terminal notifies a manual spam deregistration to the user in step 260. Herein, the notification indicates a pop up message that "The spam registration is performed for the spam number, would you like to deregister?". When a spam deregistration request is provided from the user in step 270, the portable terminal performs the spam deregistration in step 280.

When the spam deregistration request is not provided from the user in step 270, the portable terminal maintains the spam registration in step 250, and thus the portable terminal maintains the spam configuration.

When the numbers of times for originated call for the spam number or the numbers of times for transmitted message for the spam number is lesser than each threshold value in step 210 and when the spam registration times period for the spam number is shorter than the threshold value in step 220 and when the phone book storing event does occur for the spam number in step 230, the portable terminal maintains the spam registration in step 250, thus the portable terminal maintains the spam configuration.

Figure 3:
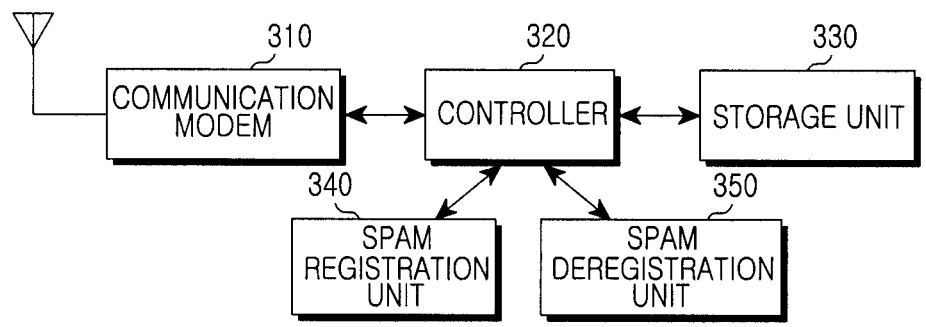

FIG. 3 illustrates a block diagram of a portable terminal according to an exemplary embodiment of the present invention.

Referring to FIG. 3, the portable terminal comprises a communication modem 310, a controller 320, a storage unit 330, a spam registration unit 340, and a spam deregistration unit 350.

The communication modem 310 is a module for performing communication with another node, and includes a radio processor and a base-band processor. The radio processor converts a signal received through an antenna into a base-band signal and provides the base-band signal to the base-band processor. Further, the radio processor converts the base-band signal received from the base-band processor into a radio signal so that the received signal can be transmitted through an actual wireless path, and then transmits the radio signal through the antenna.

The controller 320 controls an overall operation of the portable terminal. In particular, the controller 320 controls the spam registration unit 340 and the spam deregistration unit 350.

The storage unit 330 performs a function of storing a program for controlling the overall operation of the portable terminal and of storing temporary data generated in the process of executing the program. In particular, according to the present invention, the storage unit 330 stores spam configuration data for the spam registration and the spam deregistration and stores a phone book.

When a spam registration event occurs for a specific number, the operation may be performed by the user intentionally or may be performed automatically, thus the portable terminal performs an operation below.

When numbers of times for originated call for the specific number is greater than a threshold value or when numbers of times for transmitted message for the specific number is greater than a threshold value or when the specific number is already stored in the phone book, a spam registration for the specific number is prohibited by the spam registration unit 340.

In this case, the spam registration unit 340 displays a pop up message, which indicates the specific number cannot be registered as a spam, to a display unit(not shown). When none of the three conditions above is satisfied, the spam registration is granted.

When numbers of times for originated call for a spam number or numbers of times for transmitted message for the spam number is greater than each threshold value or when a spam registration time period for the spam number is longer than a threshold value or when a phone book storing event occurs for the spam number, herein, the spam deregistration unit 350 performs operations below.

The spam deregistration unit 350 determines whether an automatic spam deregistration is configured for the spam number, the spam deregistration unit 350 performs the spam deregistration for the spam number when the automatic spam deregistration is configured for the spam number.

When the automatic spam deregistration is not configured for the spam number, the spam deregistration unit 350 notifies a manual spam deregistration notice to a user, i.e., "The spam registration is performed for the spam number, would you like to deregister?" Hereafter, when a spam deregistration request is provided from the user, the spam deregistration unit 350 performs the spam deregistration for the spam number.

The spam deregistration unit 350 maintains the spam configuration for the spam number when a spam deregistration request is not provided from the user.

The controller 320 may serve as the spam registration unit 340 and the spam deregistration unit 350 Herein, they are separately illustrated to distinguish their functions. In an alternate embodiment, the controller 320 may process all or part of the functions of the spam registration unit 340 and the spam deregistration unit 350.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for a spam registration in a portable terminal, the method comprising:
   storing at least one number in a phone book;
   receiving an input, associated with a specific number, to the portable terminal;
   determining, by a spam registration unit, whether the input is a spam registration request for the specific number;
   determining, by the spam registration unit, whether a spam registration prohibit condition not to register the specific number as a spam is satisfied in response to the request, including:
      checking for the specific number in the phone book; and
      determining, by the spam deregistration unit, that the spam deregistration condition is satisfied when a number of times of an originated call for the number is greater than a threshold value; and
   not registering, by the spam registration unit, the specific number as spam when the spam registration prohibit condition is satisfied.

2. The method of claim 1, further comprising
registering, by the spam registration unit, the specific number as spam when the spam registration prohibit condition is not satisfied.

3. The method of claim 1, wherein the step of determining whether the spam registration prohibit condition is satisfied comprises:
   determining, by the spam registration unit, the spam registration prohibit condition is satisfied when the specific number is previously stored in the phone book.

4. The method of claim 1, wherein the step of determining whether the spam registration prohibit condition is satisfied comprises:
   determining, by the spam registration unit, the spam registration prohibit condition is satisfied when numbers of times for transmitted message for the specific number is greater than a threshold value.

5. A method for a spam deregistration in a portable terminal, the method comprising:
   storing a number registered as spam in the portable terminal;
   automatically internally monitoring the previously stored number with respect to at least one of a storage time of the number and an outgoing message from the portable terminal associated with the number;
   responsive to the automatic internal monitoring of the number, determining, by a spam deregistration unit, whether a spam deregistration condition for the number is satisfied, including:
      determining, by the spam deregistration unit, that the spam deregistration condition is satisfied when a number of times of an originated call for the number is greater than a threshold value;
   determining whether the portable terminal is configured for automatic deregistration of spam;
   responsive to the determination result corresponding to the portable terminal not being configured for automatic deregistration of spam, sending a notification to receive a spam deregistration request; and
   responsive to the determination result corresponding to the portable terminal being configured for automatic deregistration of spam, automatically deregistering, by the spam deregistration unit, the number from a spam registration when the spam deregistration condition is satisfied.

6. The method of claim 5, further comprising:
   maintaining, by the spam deregistration unit, the number as spam when the spam deregistration condition is not satisfied.

7. The method of claim 5, wherein the step of determining whether the spam deregistration condition for the number is satisfied comprises:
   determining, by the spam deregistration unit, the spam deregistration condition is satisfied when the number is previously stored in a phone book.

8. The method of claim 5, wherein the step of determining whether the spam deregistration condition for the number is satisfied comprises:
determining, by the spam deregistration unit, the spam deregistration condition is satisfied when numbers of times for a transmitted message for the number, as the outgoing message, is greater than a threshold value.

9. The method of claim 5, further comprising:
determining, by the spam deregistration unit, whether the spam deregistration by a user is granted when the spam deregistration condition is satisfied; and,
deregistering, by the spam deregistration unit, the number from the spam registration when the spam deregistration by the user is granted.

10. The method of claim 5, wherein the step of determining whether the spam deregistration condition for the number is satisfied comprises:
determining, by the spam deregistration unit, the spam deregistration condition is satisfied when a spam registration time period for the number is longer than a threshold value.

11. An apparatus for a spam registration in a portable terminal, comprising:
a storage unit for storing at least one number in a phone book;
an input device for receiving an input, associated with a specific number, to the portable terminal; and
a spam registration unit for determining whether the input is a spam registration request for the specific number, for determining whether a spam registration prohibit condition not to register the specific number as spam is satisfied in response to the request including checking for the specific number in the phone book and determining when a number of times of an originated call for the specific number is greater than a threshold value, and for not registering the specific number as spam when the spam registration prohibit condition is satisfied.

12. The apparatus of claim 11, wherein the spam registration unit registers the specific number as spam when the spam registration prohibit condition is not satisfied.

13. The apparatus of claim 11, wherein the spam registration unit determines the spam registration prohibit condition is satisfied when the specific number is previously stored in the phone book.

14. The apparatus of claim 11, the spam registration unit determines the spam registration prohibit condition is satisfied when numbers of times for transmitted message for the specific number is greater than a threshold value.

15. An apparatus for spam deregistration in a portable terminal, comprising:
a storage unit for storing a number registered as spam in the portable terminal;
a controller for automatically internally monitoring the previously stored number with respect to at least one of a storage time of the number and an outgoing message from the portable terminal associated with the number; and
a spam deregistration unit, responsive to the automatic internal monitoring of the number, for determining whether a spam deregistration condition for a number is satisfied including determining when a number of times for an originated call for the specific number is greater than a threshold value, for determining whether the portable terminal is configured for automatic deregistration of spam, responsive to the determination result corresponding to the portable terminal not being configured for automatic deregistration of spam for sending a notification to receive a spam deregistration request, and responsive to the determination result corresponding to the portable terminal being configured for automatic deregistration of spam, for automatically deregistering the number from a spam registration when the spam deregistration condition is satisfied.

16. The apparatus of claim 15, wherein the spam deregistration unit maintains the number as spam when the spam deregistration condition is not satisfied.

17. The apparatus of claim 15, wherein the spam deregistration unit determines the spam deregistration condition is satisfied when the number is previously stored in a phone book.

18. The apparatus of claim 15, wherein the spam deregistration unit determines the spam deregistration condition is satisfied when numbers of times for a transmitted message, as the outgoing message, for the number is greater than a threshold value.

19. The apparatus of claim 15, wherein the spam deregistration unit determines whether the spam deregistration by a user is granted when the spam deregistration condition is satisfied, and the spam deregistration unit deregisters the number from the spam registration when the spam deregistration by the user is granted.

20. The apparatus of claim 15, wherein the spam deregistration unit determines the spam deregistration condition is satisfied when a spam registration time period for the number is longer than a threshold value.

* * * * *